Aug. 12, 1952     A. C. FULLER     2,606,360
BURNISHING TOOL
Filed Dec. 22, 1949
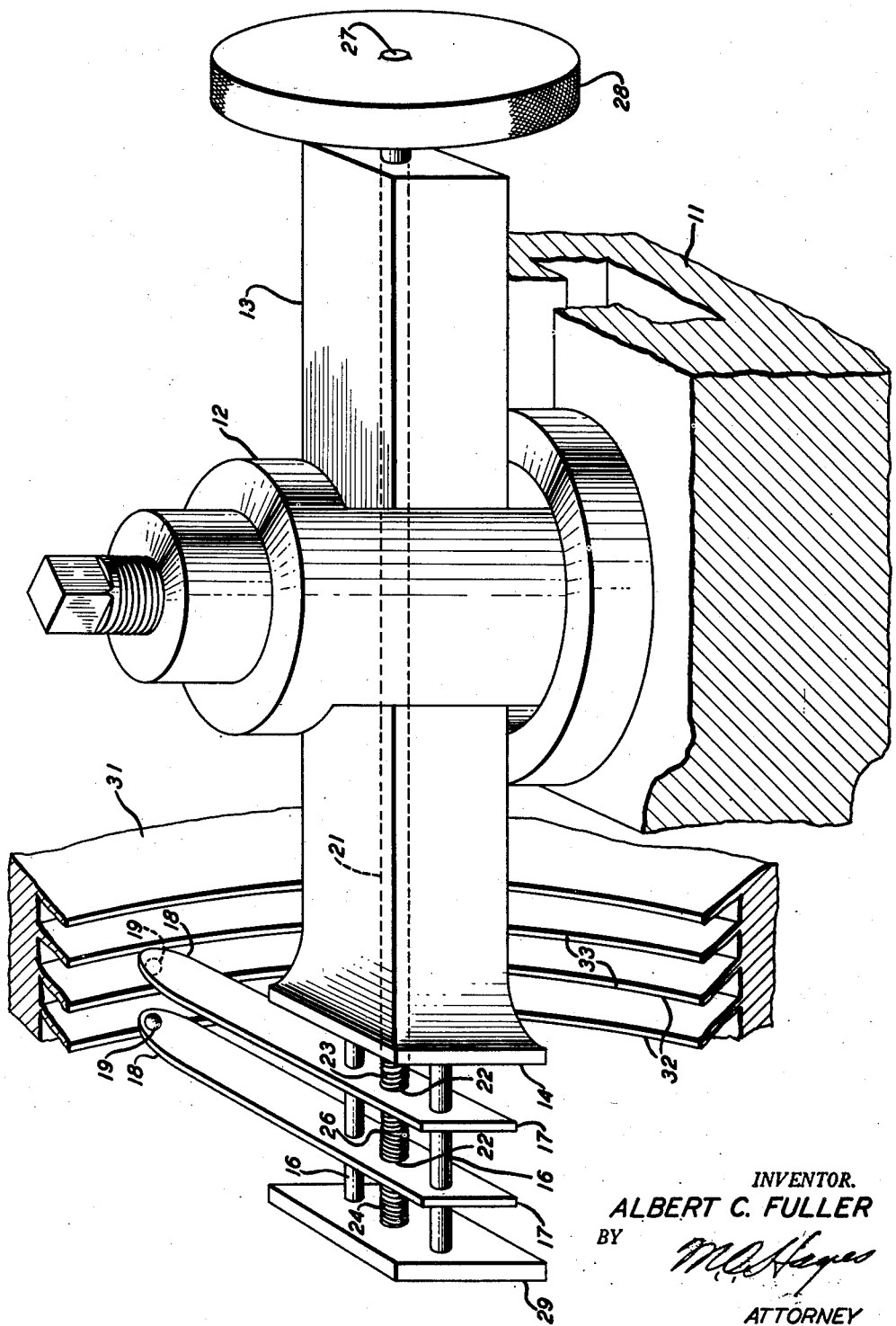
INVENTOR.
ALBERT C. FULLER
BY
ATTORNEY Patented Aug. 12, 1952

2,606,360

UNITED STATES PATENT OFFICE 2,606,360

BURNISHING TOOL

Albert C. Fuller, Long Beach, Calif.

Application December 22, 1949, Serial No. 134,562

2 Claims. (Cl. 29—90)

(Granted under the act of March 3, 1883, as amended April 30, 1928; 370 O. G. 757)

This invention relates to burnishing tools and more particularly to tools for burnishing and repairing the fins of labyrinth seals.

Heretofore, when the fins of labyrinth seals became slightly worn and damaged or undersized, repairs were effected by using rollers angularly placed in relation to the fins of the seal. However, on seals of small diameters the rollers will not turn effectively, and consequently galling of the metal fins results. Furthermore, in the above apparatus, the rollers are pre-adjusted by means of set screws, which method presents no way of judging the amount of pressure exerted on the fins during rolling.

It is an object of this invention to provide a burnishing tool for overcoming the above disadvantages.

It is another object of this invention to provide a burnishing tool which can enter between fins which are close together.

A further object of this invention is to provide a burnishing tool which is operated by a hand wheel by which the pressure on the burnishing tool is controlled.

Other objects and many of the attendant advantages of this invention will be readily appreciated as the same becomes better understood by reference to the following description.

The apparatus of the instant invention comprises generally an elongate body adapted by its rectangular cross section to be mounted in the tool post of a lathe. A pair of parallel guide rods extends longitudinally from one end of the body and serves to support and guide a pair of spaced fingers which are slidably mounted on the rods transversely thereof. In adjacent faces at the end of each finger are mounted freely rotatable balls, which do the burnishing of the fins. A lead screw is rotatably mounted longitudinally through the body extending parallel to the guide rods and through threaded holes in the fingers. The lead screw is provided with right hand and left hand threads diverging from a point between the fingers. The opposite end of the lead screw is provided with a hand knob which serves to rotate the lead screw, thereby separating or bringing together the adjacent faces of the fingers. An end plate parallel to and spaced from the end of the body serves to support and keep rigid the guide rods and the lead screw.

In operation, the burnishing tool is mounted rigidly in the tool post of a lathe, the chuck of which supports that portion of the labyrinth seal which is to be repaired. The fingers are positioned to straddle a labyrinth fin at the root thereof. The fingers are tightened together by means of the hand wheel, and while the chuck is rotating, the burnishing tool is moved outwardly from the root of the fin, thereby burnishing the fin and elongating it somewhat. This process is repeated for each fin of the seal as many times as is necessary to repair a damage.

A preferred embodiment of the instant invention has been illustrated in the accompanying drawing, wherein the single figure is a perspective view of the burnishing tool mounted in a lathe tool post and adjacent a portion of a labyrinth seal.

Referring to the drawing, 11 designates the cross slide of a lathe (not shown), in the tool post 12 of which is mounted an elongate body 13, having in this embodiment a rectangular cross section to facilitate clamping in the tool post 12. Fixed to one end 14 of the elongate body 13, a pair of parallel guide rods 16 extends longitudinally and serves to support and guide a pair of spaced fingers 17 which is slidably mounted on the rods 16 transversely thereof.

The ends 18 of the fingers 17 extend away from the axis of the body 13, and a freely rotatable steel ball 19 is mounted in each end 18 of the fingers 17 in adjacent faces thereof. The burnishing is accomplished by the rolling action of these balls 19 against the surface to be burnished. A lead screw 21 is rotatably mounted longitudinally through the body 13 and extends from the end 14 thereof parallel to the guide rods 16 and through threaded holes 22 in the fingers 17. The lead screw 21 is provided with right hand and left hand threads, 23 and 24 respectively, diverging from a point 26 midway between the fingers 17.

The opposite end 27 of the lead screw 21 is provided with a hand knob 28 which serves to rotate the lead screw 21, thereby separating or bringing together, by means of the threads 23 and 24, the adjacent faces of the fingers 17. The end plate 29 parallel to and spaced from the end 14 of the body 13 serves to support the guide rods 16 and the lead screw 21 in parallelism.

Operation

The instant invention is designed to burnish and repair both the shaft portion and the journal portion of labyrinth seals, the fins of which are either bent or worn on their bearing surface. The procedure of operation is substantially as follows: The body 13 of the burnishing tool is mounted securely in the tool post 12 of the lathe, the chuck of which (not shown) supports the labyrinth seal 31 (journal portion is illustrated). The ends 18 of the fingers 17 are positioned to straddle one of the labyrinth fins 32 at the root thereof, in such a manner that the faces of the fins 32 are equidistant from the balls 19 mounted in the fingers 17. The lathe is then started, and while the seal 31 rotates, the handwheel is turned to bring the fingers 17 together, the degree of tightening depending on the condition of the fins. The tool is then moved, by means of the cross slide 11, outwardly from the root of the fin toward the bearing surface 33. This results in the straightening and burnishing of the fin, the metal tending to flow towards the bearing surface 33, thereby assuring a closer fit between the two portions of the seal.

The free rotating action of the balls 19 assures that no galling or tearing of the metal will occur, and the small size of the fingers and balls permits insertion thereof into narrow spaces and close to the root of a fin. In practice, as much as .050 of an inch decrease in the internal diameter of an oil seal has been achieved with several passes of the instant invention.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A tool for burnishing the fins of labyrinth seals comprising an elongate body adapted to be mounted in the tool post of a lathe, a pair of parallel rods extending from one end of said body longitudinally thereof, a pair of spaced fingers slidably mounted on said rods transversely thereof, a freely rotatable ball mounted at the extremity of each of said fingers in adjacent faces thereof, a lead screw rotatably mounted in said body longitudinally thereof extending parallel to said rods and through threaded holes in said fingers, said lead screw having right hand and left hand threads diverging from a point intermediate between said fingers, and manual means for rotating the lead screw to separate or to bring together said adjacent faces of said fingers.

2. A tool for burnishing the fins of labyrinth seals comprising an elongate body, a rod extending from one end of said body longitudinally thereof, a pair of spaced fingers slidably mounted on said rod transversely thereof, a freely rotatable ball mounted at the extremity of each of said fingers, a lead screw rotatably mounted in said body longitudinally thereof extending parallel to said rod and through threaded holes in said fingers, said lead screw having right hand and left hand threads diverging from a point intermediate between said fingers, and means for rotating the lead screw to separate or to bring together said fingers.

ALBERT C. FULLER.

REFERENCES CITED

The following references are of record in the file of this patent:

UNITED STATES PATENTS

| Number | Name | Date |
| --- | --- | --- |
| 274,565 | Creque | Mar. 27, 1883 |
| 1,383,981 | Catlin | July 5, 1921 |
| 2,040,347 | Twyman | May 12, 1936 |
| 2,065,221 | Hellyar | Dec. 22, 1936 |
| 2,232,843 | Drissner et al. | Feb. 25, 1941 |
| 2,282,550 | Trerice | May 12, 1942 |
| 2,390,651 | Iseman | Dec. 11, 1945 |

FOREIGN PATENTS

| Number | Country | Date |
| --- | --- | --- |
| 373,572 | Great Britain | May 26, 1932 |